March 5, 1940.   G. P. GILMAN   2,192,305

SEAL FOR ROTATING SHAFTS

Filed Aug. 26, 1937

Inventor:
George P. Gilman,
By: Cox & Moore Attys.

Patented Mar. 5, 1940

2,192,305

UNITED STATES PATENT OFFICE 2,192,305

SEAL FOR ROTATING SHAFTS

George P. Gilman, Chicago, Ill., assignor to Rotary Seal Company, Chicago, Ill., a corporation of Illinois Application August 26, 1937, Serial No. 160,976

6 Claims. (Cl. 288—3)

My invention relates in general to seals and sealing, and has more particular reference to the sealing of rotating shafts in order to prevent the escape of fluids along the shaft past a wall or journal in which the shaft extends.

An important object of the present invention is to provide an improved seal of simplified construction and unusually efficient operating characteristics.

Another object is to provide a seal comprising a pair of cooperating elements, one of which is of rubbery material and adapted to tightly fit upon and grip the shaft, to rotate therewith, the other element being formed to snugly fit in a wall cavity through which the shaft extends, including a plate adapted to bear on the rubbery material and form a running seal therewith; a further object being to form the plate as a flange received in a slot formed in the rubbery element, the flange riding in the slot when the device is in operation; a further object being to form the slot as a circumferential groove in the rubbery element.

Another object is to form the rubbery element as an annular ring having an annular slot opening peripherally in the ring in position to receive an annular plate element in the slot in position extending substantially at right angles with respect to the axis of the ring; a further object being to constrain the ring circumferentially adjacent the annular slot in order to yieldingly urge the material of the ring against the opposing faces of the plate in the slot; and a still further object is to utilize the inherent tendency of the rubber-like material of the ring to swell in service, in conjunction with the circumferentially restraining means, to press the material of the ring against the plate.

A further object is to constrain the rubbery element by means of annular restraining elements applied on the rubbery element on opposite sides of the slot; a further object being to form the constraining elements as continuous wire loops adapted to be applied in grooves formed circumferentially in the rubber element on opposite sides of the annular plate-receiving slot thereof.

Another important object is to provide means for mounting the plate as a tight press fit in a cavity through which extends a shaft on which the seal may be mounted.

A further object is to make the plate of hardened steel; and a further object is to shrink the plate within a holding element.

Another object is to provide a modified construction wherein the plate and rim are integral.

Another object is to mount the plate resiliently in said rim, as by embedding it in a rubber block held in the rim.

Another object is to make the plate-receiving slot deep enough to provide a substantial clearance between the bottom of the slot and the inner edge of the annular plate in order that the seal may function effectively even when the axis of the shaft being sealed is out of line with the axis of the opening through which the shaft extends and in which the seal is mounted; a further object being to form the rubbery element with a substantial section in order to accommodate whipping of the shaft without destroying the effectiveness of the seal.

Another object is to make the rubbery element with substantial width and area in contact with the shaft in order that the same may snugly grip the shaft and prevent leakage along the shaft between the rubbery element and the shaft, the opening of the element receiving the shaft being of a size to grip the shaft and provide adequate sealing regardless of the surface condition of the shaft, whereby the seal may be applied successfully on a scored shaft without requiring smoothing of the shaft surface.

Another important object is to provide a self-alining seal adapted not only to exclude foreign matter from entering along the shaft, but also safely to prevent the escape of oil or other lubricating matter along the shaft, as well as to prevent leakage of any liquid or gaseous fluid even under substantial pressure, the seal of my present invention being adapted for use as a shaft seal in air and gas compressors as well as in liquid pumps or simply as an oil-retaining device in shaft bearings.

Numerous other objects, advantages, inherent functions and utilities of the invention will become apparent as the same is more fully understood from the following description which, taken in connection with the accompanying drawing, discloses preferred embodiments of the invention.

Referring to the drawing.

Figure 1:
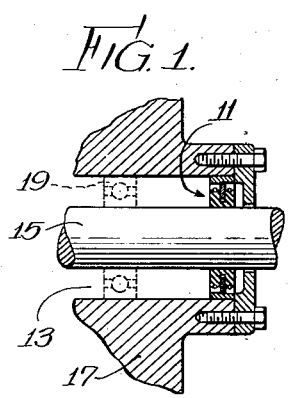
Figures 1 and 2 are sectional views illustrating applications of the invention.
Figure 2:
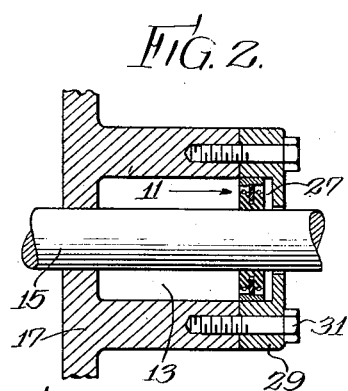

To illustrate the invention, I have shown on the drawing a shaft seal 11, particularly adapted for use on a rotating shaft 15 for sealing the same against leakage along the shaft through the opening 13 in a wall 17 through which the shaft extends. This opening 13 may, of course, comprise a cavity for the usual shaft bearing 19, as shown in Figure 1, or as shown in Figure 2 may comprise the cavity ordinarily provided around the shaft for the reception of packing material or other shaft sealing means. The form, shape and arrangement of the cavity is not necessarily a limitation upon my invention. The seal 11 comprises an inner portion 21 adapted to snugly fit upon the shaft, and an outer portion 23, comprising a rim 25, which, as shown in Figure 1, is adapted to be snugly press-fitted into the opening 13, or as shown in Figure 2 the part 25 may be pressed into a socket 27 formed in a cover member 29 which, as shown, may comprise a plate adapted to be secured to the casing 17 as by bolts 31 or other suitable fastening means in order to enclose the opening 13 around the shaft.

The inner seal element 21 preferably comprises a resilient ring 33 of rubbery material, preferably a synthetic rubber compound. The ring 33 has a central opening 35 very slightly smaller than the diameter of the shaft on which the seal is used so that the ring may press itself snugly upon the shaft regardless of shaft inaccuracies or scoring, and the gripping of the ring on the shaft forms a driving connection whereby the rotation of the shaft causes rotation of the ring. The ring 33, when mounted, extends outwardly of the shaft and has a relatively deep annular slot 37 opening circumferentially to provide a pair of outstanding ring portions 39 on opposite sides of the slot.

The seal element 23, as previously stated, comprises a rim 25, which carries extending inwardly thereof a plate 41 having a central opening and adapted to extend in the slot 37, the slot being of such width that the material of the ring portions 39 will press upon the opposite faces of the plate or flange 41, at the same time permitting the plate 41 to rotate in the slot. To insure that the ring portions 39 yieldingly press upon the flange 41 at all times, particularly during the service life of the seal, I apply constraining elements 43 circumferentially upon the ring portions 39, the constraining elements 43 preferably comprising continuous wire rings formed to seat snugly in grooves 45 formed in the circumferential surfaces of the ring portions 39.

The ring 33 may be conveniently formed by molding or cutting the rubber-like material of which it is comprised, and the seal element 23 may be assembled simply by bending one of the ring portions 39 to permit the flange 41 to be assembled in the slot 37. Thereupon the restraining elements 43 may be applied, and the seal is then ready for attachment and use. The seal may be mounted simply by forcing the same upon and along the shaft into operating position, the rim 25 being press-fitted into the opening 13 in the arrangement shown in Figure 1, or similar applications. In the application illustrated in Figure 2, however, the seal may first be mounted in the cover element 29 by press-fitting the rim 23 into the cavity 27, then the plate carrying the seal 11 may be applied by forcing the same upon the shaft 15, the plate and seal being finally secured in position by application of the holding means 31.

When the seal is in operation, particularly when operating in contact with a lubricant, I find that the material of the ring 33 has a tendency to swell slightly. This swelling, it is thought, causes the portions 39 to expand within the retaining elements 43, which of course limit circumferential expansion, so that expansion of the portions 39 takes place in an axial direction, thus insuring a snug grip upon the plate or flange 41. Rubbery material, including synthetic rubber compositions, is reasonably slippery, particularly in the presence of a lubricant, and I find that the ring portions 39 will will slide freely upon the surfaces of the plate 41. At the same time, the ring 33, when compressed upon the shaft, will grip the shaft with sufficient tightness to safely bind the ring on the shaft so that the ring turns with the shaft, thus avoiding danger of leakage along the shaft through the ring, and also avoiding the danger of scoring the shaft due to relative movement between the shaft and the ring 33. To aid in this effect I find that after the seal has been in operation for a short period of time, with the ring turning with the shaft, there is a tendency of the rubbery material to vulcanize itself upon the shaft.

The ring 33 also is preferably given a sufficient sectional area to permit the resilience of the ring to accommodate end play of the shaft while maintaining a snug sealing fit thereon, and the groove 37 is made sufficiently deep to avoid binding of the inner edge of the flange 41 upon the ring 33 at the bottom of the slot 37. This arrangement permits the seal to operate successfully even though the axis of the shaft may be considerably eccentric with respect to the axis of the rim 25, and also accommodate shaft vibration or whipping.

Figure 3:
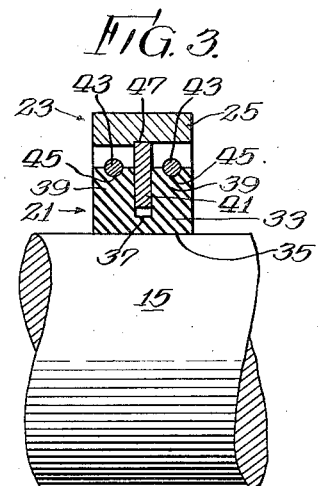
Figure 3 is an enlarged sectional view revealing details of a shaft seal embodying my present invention.
Figure 5:
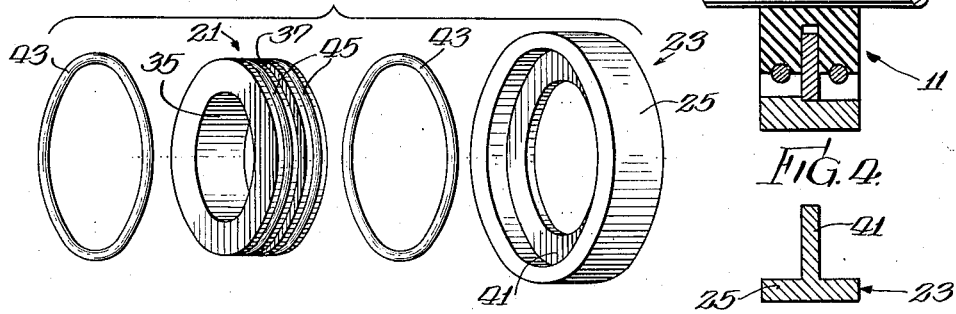
Figure 5 is an exploded perspective view of the parts forming the seal illustrated in Figure 3.
Figure 4:
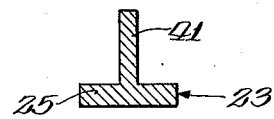
Figure 4 is a sectional view illustrating a modified construction of a part of the seal shown in Figure 3.

As shown in Figure 3, the seal element 23 may comprise separate rim 25 and plate portion 41, the plate portion 41 being shrunk into place in the rim by forming the rim with an internal seat 47 very slightly smaller than the external diameter of the plate portion 41. Then by heating the rim to expand the same, the plate portion may be dropped in place within the seat 47 and the rim cooled to shrink it tightly upon the plate. This arrangement is advantageous since it permits the plate portion 41 to be hardened and reduces the cost of fabricating the part, since the rim may be made by cutting sections from a pre-formed pipe wire; the plate may be formed simply by stamping it from a flat stock sheet. Alternately, the plate and rim portions may be formed as an integral element, as shown in Figure 4.

Figure 6:
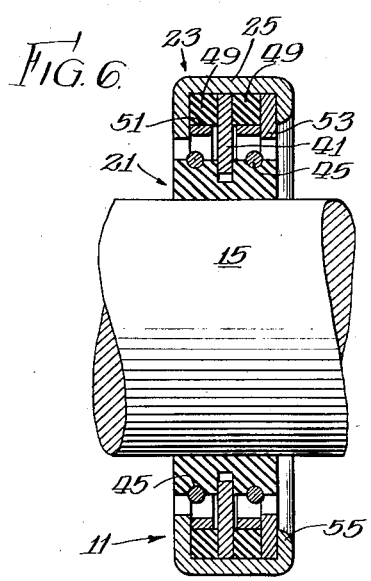
Figures 6 and 7 are sectional views similar to Figure 3 and illustrating modified arrangements of my new seal.
Figure 7:
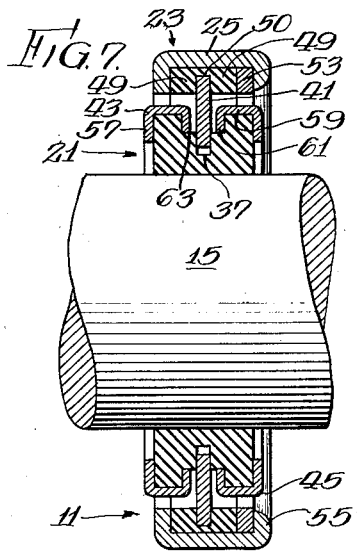

As shown in Figures 6 and 7, the plate portion 41 may be mounted resiliently in the rim, and to this end the rim 25 may be formed as a cup for receiving an annular block or blocks of resilient material which may be, and preferably is, synthetic rubber similar to the ring 33. In Figure 6 this resilient plate mounting material comprises a pair of rings 49 disposed within the rim 25 on opposite sides of the plate, the rings 49 being held in place radially by holding elements 51.

As shown in Figure 7, the resilient mounting portions 49 are formed as an integral annular block having a groove 50 formed therein for the reception of the outer edge of the plate 41, with the portions 49 disposed on opposite sides of the block.

The rings 49 and plate 41 are held in the rim 25 by a washer 53 secured in place by peening an edge of the rim 25 in the manner shown at 55.

In Figure 7 also I have shown a modified arrangement of the ring constraining elements 43, comprising annular channeled elements having each a flange 57 adapted to overlie the outer edges of the sides of the portions 39, and an annular portion 59 overlying the circumferential surface of the ring portion 39, including an inner flange 61 adapted to extend in a seat 63 at the open end of the slot 37. It is desirable that the flanges 61 be set away from the plate 41 sufficiently to safely prevent engagement of the parts during the operation of the seal, in order to avoid running contact between metallic portions.

The seal of my present invention may be manufactured at low cost; however, I find it to be unusually efficient in preventing leakage, not only of oil or other lubricant, as from bearings, but the seal also prevents the escape even of highly penetrating fluids, and consequently may be used in air compressors, refrigerating machines, vacuum pumps and the like; in fact my present seal has universal application in sealing rotating shafts. The seal may be made as a replacement unit, and as such may be attached on even badly scored shafts without necessitating re-surfacing of the shaft. Since the only portion of the seal which engages the shaft is fast upon the same and rotates therewith, scoring of the shaft is entirely eliminated. The seal also is self-alining and compensates for end play as well as for shaft vibration or whipping. The running seal is provided between the plate 41, which is stationary, and the ring portions 49, which rotate with the shaft and press upon the opposite sides of the stationary plate. It will be seen that the seal provides a double seal contact in the running seal portions, because the plate 41 is engaged on both sides by portions of the sealing ring 33. The bottom of the plate-receiving slot 37 likewise forms a pocket for the entrapment of oil or other fluid which may penetrate inwardly along one surface of the seal. My seal is thus adapted to provide a multiple or tandem sealing effect without, however, increasing the overall dimension or size of the seal, the width of which ordinarily may be less than one-half the diameter of the shaft upon which the seal is applied.

It is thought that the invention and its numerous attendant advantages will be fully understood from the foregoing description, and it is obvious that numerous changes may be made in the form, construction and arrangement of the several parts without departing from the spirit or scope of the invention and without sacrificing its attendant advantages, the forms herein disclosed being preferred embodiments for the purpose of demonstrating the invention.

Having thus described by invention, what I claim as new and desire to secure by Letters Patent of the United States is:

1. A seal for a rotating shaft comprising a ring of resilient material formed with an annular slot opening circumferentially on said ring, said ring being adapted to snugly engage upon the shaft, a cooperating element adapted for arrangement in a wall opening through which the shaft extends and comprising a plate having an annular edge extending in said slot, and annular constraining elements extending circumferentially on said ring on opposite sides of said slot.

2. A seal for a rotating shaft comprising a ring of resilient material formed with an annular slot opening circumferentially on said ring, said ring being adapted to snugly engage upon the shaft, a cooperating element adapted for arrangement in a wall opening through which the shaft extends and comprising a plate having an annular edge extending in said slot, and annular constraining elements extending circumferentially on said ring on opposite sides of said slot, said constraining elements comprising continuous wire loops.

3. A seal for a rotating shaft comprising a ring of resilient material formed with an annular slot opening circumferentially on said ring, said ring being adapted to snugly engage upon the shaft, a cooperating element adapted for arrangement in a wall opening through which the shaft extends and comprising a plate having an annular edge extending in said slot, and annular constraining elements extending circumferentially on said ring on opposite sides of said slot, said constraining elements comprising continuous channels mounted circumferentially on the ring on opposite sides of said slot.

4. A seal for a rotating shaft comprising a pair of cooperating annular elements adapted for relatively concentric arrangement, including a ring of resilient material having an annular, circumferentially open slot and adapted for mounting on the shaft for rotation therewith, a cooperating element comprising a disk having an annular edge adapted to extend in said slot and form a running seal with said ring, means for mounting said disk comprising an annular rim, and packing means held in said rim in position receiving the peripheral portions of said disk.

5. A seal for a rotating shaft comprising a pair of cooperating annular elements adapted for relatively concentric arrangement, including a ring of resilient material having an annular, circumferentially open slot and adapted for mounting on the shaft for rotation therewith, a cooperating element comprising a disk having an annular edge adapted to extend in said slot and form a running seal with said ring, and means for mounting said disk comprising a cylindrical rim having an internal shoulder receiving the peripheral edge of said disk, said rim being shrunk-fitted upon said disk.

6. A seal for a rotating shaft, comprising a pair of cooperating annular elements adapted for relatively concentric arrangement, including a ring of resilient material having an annular, circumferentially open slot and adapted for mounting on the shaft for rotation therewith, a cooperating element comprising a disk having an annular edge adapted to extend in said slot and form a running seal with said ring, and means for resiliently mounting said disk comprising an annular rim, and resilient packing means in said rim in position receiving the peripheral portions of said disk to yieldingly and sealingly mount the same in said rim.

GEORGE P. GILMAN.